United States Patent
Tati et al.

(10) Patent No.: US 9,063,866 B1
(45) Date of Patent: Jun. 23, 2015

(54) PAGE TABLE DATA STRUCTURE FOR ONLINE CLASSIFICATION OF MEMORY PAGES BASED ON ACTIVITY LEVEL

(75) Inventors: Kiran Tati, Santa Clara, CA (US); Irfan Ahmad, Mountain View, CA (US)

(73) Assignee: VMware, Inc., Palo Alto, CA (US)

( * ) Notice: Subject to any disclaimer, the term of this patent is extended or adjusted under 35 U.S.C. 154(b) by 72 days.

(21) Appl. No.: 12/834,677

(22) Filed: Jul. 12, 2010

(51) Int. Cl.
- G06F 12/00 (2006.01)
- G06F 9/455 (2006.01)
- G06F 12/10 (2006.01)
- G06F 12/08 (2006.01)

(52) U.S. Cl.
CPC ............... *G06F 12/10* (2013.01); *G06F 12/08* (2013.01)

(58) Field of Classification Search
CPC .................................. G06F 12/08; G06F 12/10
USPC ....................................... 711/207, 156; 718/1
See application file for complete search history.

(56) References Cited

U.S. PATENT DOCUMENTS

| | | | |
|---|---|---|---|
| 6,035,377 A | 3/2000 | James et al. | |
| 7,809,904 B1* | 10/2010 | Wilt | 711/159 |
| 2003/0217246 A1 | 11/2003 | Kubota et al. | |
| 2004/0078518 A1* | 4/2004 | Kuwata | 711/113 |
| 2005/0232192 A1 | 10/2005 | Rawson | |
| 2006/0117160 A1 | 6/2006 | Jackson et al. | |
| 2006/0200546 A9 | 9/2006 | Bailey et al. | |
| 2007/0011421 A1 | 1/2007 | Keller et al. | |
| 2007/0288783 A1 | 12/2007 | Ogasawara et al. | |
| 2008/0034234 A1* | 2/2008 | Shimizu et al. | 713/320 |
| 2008/0201542 A1 | 8/2008 | Maruyama et al. | |
| 2008/0320203 A1 | 12/2008 | Fitzgerald | |
| 2009/0064136 A1 | 3/2009 | Dow et al. | |
| 2009/0182976 A1* | 7/2009 | Agesen | 711/207 |
| 2009/0240899 A1 | 9/2009 | Akagawa et al. | |
| 2010/0058086 A1 | 3/2010 | Lee | |
| 2010/0191922 A1 | 7/2010 | Dickey | |
| 2011/0154104 A1 | 6/2011 | Swanson et al. | |
| 2011/0271070 A1* | 11/2011 | Worthington et al. | 711/165 |
| 2012/0011504 A1 | 1/2012 | Ahmad et al. | |

OTHER PUBLICATIONS

U.S. Appl. No. 12/683,273, filed Jan. 6, 2010 in the name of Scales et al.
U.S. Appl. No. 12/834,669, filed Jul. 12, 2010 in the name of Ahmad et al.
U.S. Appl. No. 13/179,032, filed Jul. 8, 2011 in the name of Ahmad.

* cited by examiner

*Primary Examiner* — Aracelis Ruiz

(57) ABSTRACT

Activity level of memory pages is classified in virtual machine environment, so that processes such as live VM migration and checkpointing, among others, can be carried out more efficiently. The method includes the steps of scanning page table entries of hypervisor-managed page tables continuously over repeating scan periods to determine whether memory pages have been accessed or not, and for each memory page, determining an activity level of the memory page based on whether the memory page has been accessed or not since a prior scan and storing the activity level of the memory page. The activity level of the memory page may be represented by one or more bits of its page table entry and may be classified as having at least two states ranging from hot to cold.

21 Claims, 8 Drawing Sheets

PAGE TABLE DATA STRUCTURE FOR ONLINE CLASSIFICATION OF MEMORY PAGES BASED ON ACTIVITY LEVEL

BACKGROUND

Managing memory resources is an important function of computer system software. A conventional operating system, for example, manages virtual memory to physical memory page mappings through a level of virtual to physical indirection. The virtual memory to physical memory mapping is transparent to an application referencing memory via a virtual address. This indirection enables the operating system to utilize one or more virtual memory address spaces that together are larger than physical memory and store recently accessed pages within physical memory for efficient access and to swap out pages (e.g., between memory and storage, etc.) that are less recently accessed.

In virtual machine environments, in which virtual machines (VMs) employ guest operating systems to provide guest virtual memory to guest physical memory mappings, a hypervisor provides a second level of indirection to provide guest physical memory to machine memory mappings. Because the hypervisor manages guest physical memory to machine memory page mappings, it is able to identify and isolate the guest physical memory of specified VMs within the machine memory and "migrate" memory pages of a VM from a source machine to a destination machine making possible a variety of hypervisor-based services to assist IT administrators in managing VM-based data centers. For example, entire VM states (e.g., memory space and processor state) can be migrated in real time (referred to as "live migration") from one server to another server for dynamic load balancing across hosts and other management operations, or to create backup VMs on separate hosts, which serve as replicas of the primary VM, and are used for fault tolerance (FT).

In each of these examples, memory pages are being transmitted from a source machine to a destination machine. As the process is being carried out, the same memory page, however, may be transmitted more than once, e.g., if a memory page that has been transmitted is modified at the source machine before the process completes. Retransmitting memory pages wastes time, adds computational overhead, and unnecessarily consumes network bandwidth. Therefore, what is needed in the art is a technique for carrying out hypervisor-based services in a more time and resource efficient manner.

SUMMARY

One or more embodiments of the present invention provide a method of classifying activity levels of memory pages in a virtual machine environment, e.g., guest physical memory pages of virtual machines, so that processes such as live VM migration and checkpointing, among others, can be carried out more efficiently. The method includes the steps of scanning page table entries of hypervisor-managed page tables continuously over repeating scan periods to determine whether memory pages have been accessed (or, in some cases, modified), and for each memory page and at each scan period, determining an activity level of the memory page based on whether the memory page has been accessed (or modified) since a prior scan, and storing the activity level of the memory page.

A computer system according to an embodiment of the present invention includes one or more virtual machines running therein, and a hypervisor for managing page tables that provide mappings from guest physical memory pages to machine memory pages. The hypervisor of this embodiment is programmed to scan entries of the pages tables continuously and repeatedly in accordance with a scan rate and determine an activity level of a machine memory page corresponding to the scanned page table entry based on whether an accessed or dirty bit of the scanned page table entry is set and store the activity level of the machine memory page.

A page table data structure embodied in a computer-readable storage medium according to an embodiment of the present invention includes a plurality of hierarchically arranged page tables, wherein each entry of the bottom level page table maps to a memory page and includes at least one bit that indicates an activity level of the memory page. Multiple bits can be used to indicate an activity level of the memory page as being low or high, and multiple intermediate levels between low and high.

DETAILED DESCRIPTION

Figure 1:
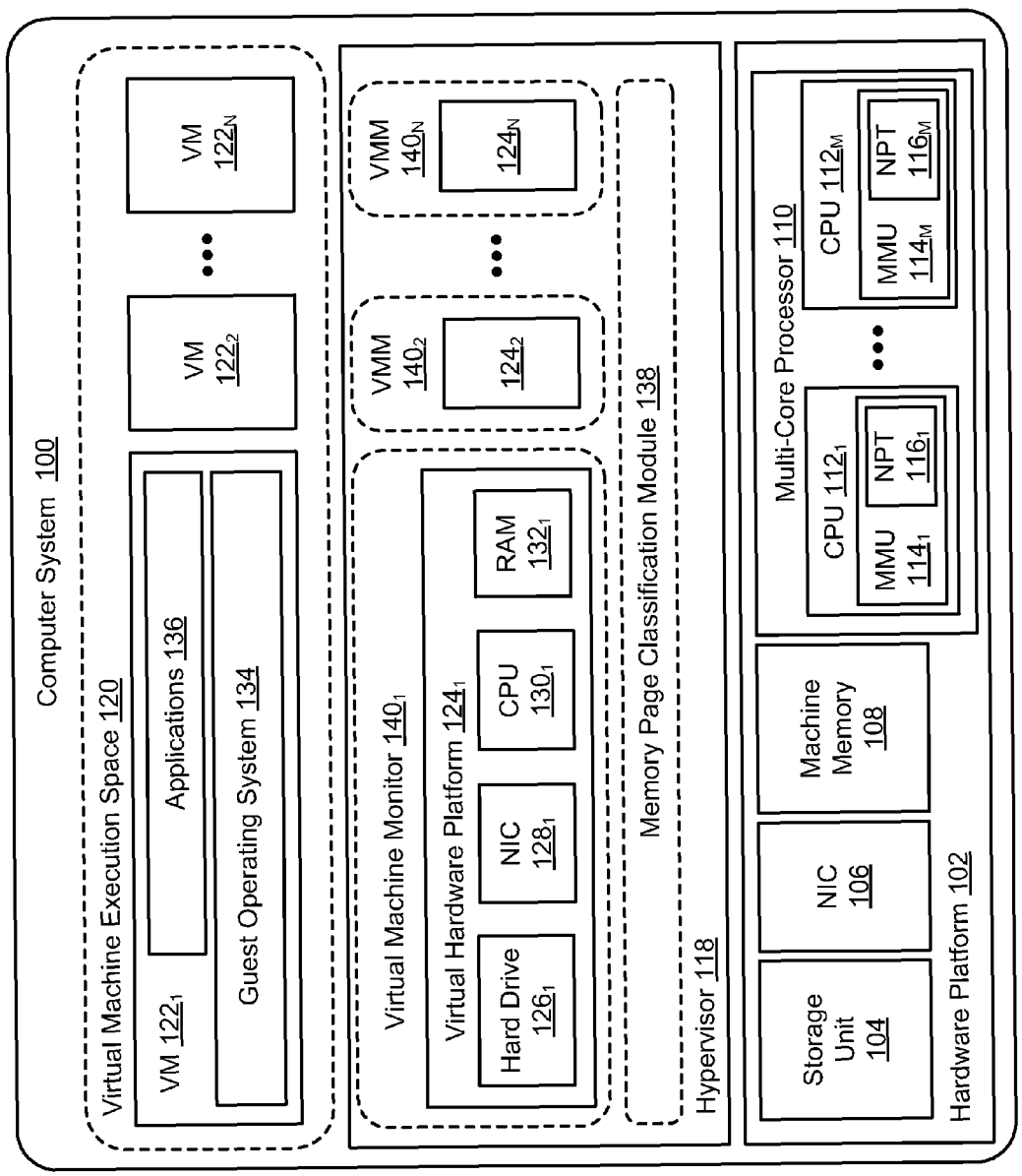
FIG. 1 is a block diagram illustrating a computer system configured to implement one or more aspects of the present invention.

FIG. 1 is a block diagram illustrating a computer system configured to implement one or more aspects of the present invention. Host computer system 100 may be constructed on a desktop, laptop or server grade hardware platform 102 such as an x86 architecture platform. Such a hardware platform may include a local storage unit 104, such as at least one hard drive, at least one network adapter (NIC 106), machine memory 108, one or more multi-core processors 110 (only one of which is illustrated in FIG. 1) and other I/O devices such as, for example and without limitation, a mouse and keyboard (not shown in FIG. 1). Multi-core processor 110 provides multiple CPUs $112_1$ to $112_M$ which operate concurrently and can read and write to any portion of machine memory 108. Each of CPUs $112_1$ to $112_M$ includes a memory management unit (MMU) 114 with a support module 116 for nested page tables (NPT), which implement a technique also known as rapid virtualization indexing (RVI) or extended page tables (EPT). One of the functions of support module 116 is traversing the NPT to translate received virtual physical addresses of a VM's guest operating system into the actual corresponding machine addresses of machine memory 108. This feature inside support module 116 is referred to herein as the "hardware NPT walker." Examples of a multi-core processor 110 that supports such nested page table structures include AMD's Opteron™ family of multi-core processors and Intel's Nehalem processors with EPT, which is the term Intel uses in lieu of nested page tables.

A virtualization software layer, also referred to hereinafter as hypervisor 118, is installed on top of hardware platform 102. Hypervisor 118 supports virtual machine execution space 120 within which multiple VMs may be concurrently instantiated and executed. As shown, virtual execution space 120 includes VMs $122_1$-$122_N$. For each of VMs $122_1$-$122_N$, hypervisor 118 manages a corresponding virtual hardware platform (i.e., virtual hardware platforms $124_1$-$124_N$) that includes emulated hardware such as at least one virtual hard drive $126_1$, at least one virtual NIC $128_1$, one or more virtual CPUs $130_1$ (only one of which is illustrated in FIG. 1) and RAM $132_1$ for VM $122_1$. For example, virtual hardware platform $124_1$ may function as an equivalent of a standard x86 hardware architecture such that any x86 supported operating system, e.g., Microsoft Windows®, Linux®, Solaris® x86, Novell NetWare®, FreeBSD, etc., may be installed as guest operating system 134 to execute any supported application in application layer 136 for user VM $122_1$. Guest operating system 134 of VM $122_1$ includes device drivers (e.g., pre-existing device drivers available for guest operating system 134 etc.) that interact with emulated devices in virtual hardware platform $124_1$ as if such emulated devices were actual physical devices. Hypervisor 118 is responsible for transforming requests from device drivers in guest operating system 134 that are received by emulated devices in virtual platform $124_1$, into corresponding requests to corresponding physical devices in hardware platform 102. Hypervisor 118 further comprises a memory page classification module 138 that, as further described below, classifies memory pages of a VM based on the states of a finite state machine (FSM).

It should be recognized that alternative computer systems may be configured to implement one or more aspects of the present invention, including, for example, computer systems with one or more single-core hardware processors. Similarly, computer systems without hardware support for nested page tables may be configured to implement one or more aspects of the present invention. For example, one such computer system may comprise a hypervisor 118 that manages shadow page tables in a software based MMU that maps guest virtual memory pages directly to machine memory pages in machine memory 108. It should further be recognized that the various terms, layers and categorizations used to describe the virtualization components in FIG. 1 may be referred to differently without departing from their functionality the spirit or scope of the invention. For example, virtual hardware platforms $124_1$-$124_N$ may be considered to be part of virtual machine monitors (VMM) $140_1$-$140_N$ which implement the virtual system support needed to coordinate operations between hypervisor 118 and their respective VMs. Alternatively, virtual hardware platforms $124_1$-$124_N$ may also be considered to be separate from VMMs $140_1$-$140_N$, and VMMs $140_1$-$140_N$ may be considered to be separate from hypervisor 118. Similarly, in alternative embodiments, memory page classification module 138 of hypervisor 118 may comprise or be considered to be separate logical modules within each of VMMs $140_1$-$140_N$ that each serves corresponding VM $122_1$-$122_N$. One example of hypervisor 118 that may be used in accordance with the teachings herein is included as a component of VMware's ESX™ product, which is commercially available from VMware, Inc. of Palo Alto, Calif. It should further be recognized that other general purpose operating systems and virtualized computer system architectures may be used consistent with the teachings herein, such as hosted virtual machine systems, where the hypervisor is designed to run on top of a host operating system, or a shared storage array network (SAN) that is shared among various virtualized computer systems (e.g., clusters) in order to store virtual hard drives such as hard drive $126_1$. It should also be recognized that the techniques taught herein could be efficiently implemented directly in hardware, such as to augment the function of a processing unit. For example, a processor such as an x86 or SPARC processor could implement heat classification via microcode or via one or more specialize hardware modules. Furthermore, a processor support chip, such as a memory interface chip, could implement page heat classification directly.

In computer system 100, in which VMs 122 employ guest operating systems 134 to provide guest virtual memory to guest physical memory mappings, hypervisor 118 provides guest physical memory to machine memory mappings. The guest virtual memory space is mapped to the guest physical memory space using guest page tables and the guest physical memory space is mapped to the machine memory space using nested page tables that are managed by hypervisor 118. In some embodiments, the guest virtual memory space may be mapped directly to the machine memory space using shadow page tables that are managed by hypervisor 118.

When data is written to or read from machine memory 108, the accessed bit A of page table entries corresponding to a page in machine memory 108 that is being written to or read from is set (assigned a value of "1"), and if the access was a write access, then the dirty bit D is also set, indicating that the memory page has been written to (the accessed and dirty bits are collectively referred to herein as "A/D" bits). Once set, the A/D bits remain set until cleared. It should be understood that "set" being represented as a value of "1" and "cleared" being represented as a value of "0" is arbitrary and any other technically feasible representation may be used.

In the example of a computer system that utilizes shadow page tables, which map guest virtual memory pages directly to machine memory pages, the hypervisor cannot determine directly from the shadow page tables whether or not a guest physical page has been accessed or dirtied. In order to obtain A/D information of a guest physical page, the hypervisor first obtains all of the guest virtual pages that are mapped to the guest physical page using a backmap maintained by the corresponding VMM and examines the page table entries of these guest virtual pages in the shadow page tables. If the accessed A bit of any of these page table entries is set, the hypervisor determines the accessed A bit of the guest physical page to be set. If the dirty D bit of any of these page table entries is set, the hypervisor determines the dirty D bit of the guest physical page to be set.

One important characteristic of memory access patterns, measured broadly over different types of applications and computational tasks, is one based on temporal locality, that a recently accessed page is likely to be accessed in the near future, while a page that has not been accessed recently is correspondingly less likely to be accessed in the near future. Therefore, recently accessed pages may be classified as "hot" pages that are likely to be accessed in the near future, and pages that have not been accessed recently may be classified as "cold" pages that are unlikely to be accessed in the near future. This hot through cold classification of individual memory pages is widely applicable to most access patterns targeting machine memory 108. Hot pages are only hot for a certain arbitrary time span, and may cool and become cold over time. Similarly, cold pages may become warmer and then hot over time. Because access to each page is an individual and temporal characteristic of the page, only an appropriately recent classification of the page as hot or cold is more precise. Therefore, page classification should be an online process that continually updates a "heat" classification of each page. The heat classification includes at least two classification levels ranging from hot to cold, inclusive.

The page classification process should not incur significant overhead, so that updates can be sufficiently frequent to provide useful and timely classification. In one embodiment, a finite state machine (FSM) is used to efficiently implement the page classification process. The FSM is configured to periodically update state information specific to each page. The updated state information is based on: (1) the current state of the page, and (2) currently sampled A/D bits, either or both of which would be set if the page was accessed since a most recent sample was taken. An access history with respect to real time for a given page is therefore represented as an FSM state corresponding to the page. A history of repeated recent access to the page suggests that the page is hot and will likely be accessed again in the near future, while a history of no access to the page suggests that the page is cold and will likely not be accessed in the near future. In some embodiments, it may be useful to measure access rates with respect to a VM's virtual execution time using an FSM or other means described herein. One reason for doing this is to not penalize a VM for not accessing pages in cases where the VM is forcibly descheduled by the hypervisor.

Figure 2:
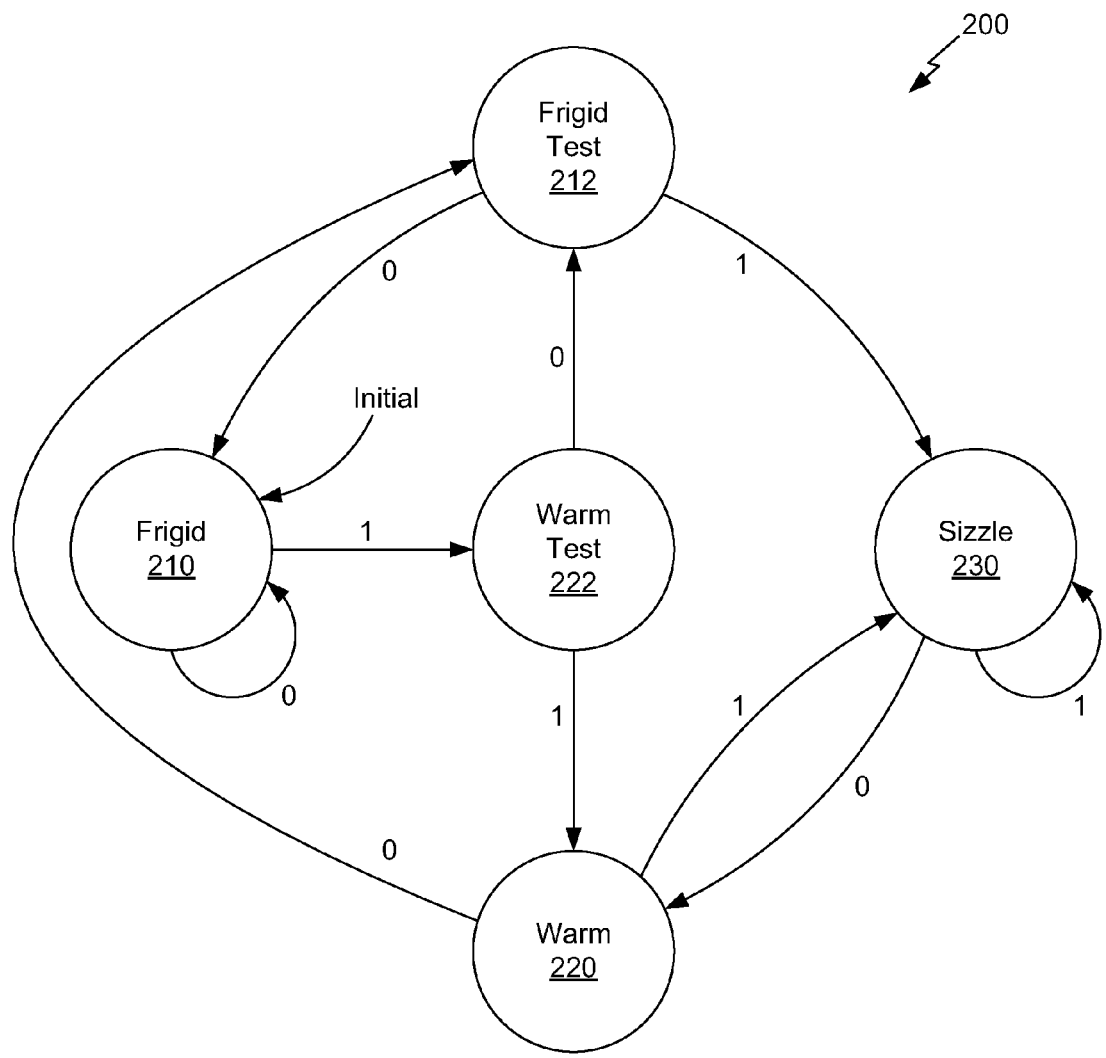
FIG. 2 illustrates a finite state machine (FSM) for classifying a memory page, according to one embodiment of the invention.

An FSM, according to one embodiment of the invention, that is configured to classify memory page access from hot (sizzle) to cold (frigid) based on a plurality of A/D bit samples is illustrated in FIG. 2. The FSM 200 includes five states, including frigid 210, frigid test 212, warm 220, warm test 222, and sizzle 230. State transitions are determined based on a page status value of either zero "0" or one "1" that is derived from the A/D bits for the corresponding page. A state transition arc from each state for each page status value of "0" or "1" is shown. For example, in frigid state 210, a page status value of "0" results in the FSM transitioning back to frigid state 210, while a page status value of "1" results in the FSM transitioning to warm test state 222. The page status value may correspond to the A bit or the D bit, depending on whether the classification process should distinguish between read and write accesses. In one embodiment, the value of the A bit for the page defines the page status value. In an alternative embodiment, the D bit for the page defines the page status value. In another alternative embodiment, the page status value is determined based on whether the corresponding page was marked as writable within a certain time span. In yet another alternative embodiment, separate state is maintained for a plurality of uniquely defined page status values, each with a corresponding page heat classification state. It should be recognized that other types of status information may be used to define a page status value for input to FSM 200, and plural instances of FSM 200 may be simultaneously implemented to respond to different types of status information simultaneously without departing the scope of the present invention.

As shown, sizzle state 230 is reached from either three successive page status values of "1" being sampled in a row {1,1,1}, or a page status value of "1" being sampled followed by a "0" followed by another "1" {1,0,1}. Once the FSM 200 is in sizzle state 230, any "0" subsequently encountered will cause the FSM 200 to transition to warm state 220. However, a subsequent "1" will cause a transition back to sizzle state 230. Each possible transition is illustrated in FIG. 2. As shown, frigid state 210 is the initial state of the FSM 200. Page heat classification is directly represented by the present state of FSM 200. Sizzle state 230 represents a maximum page heat (hot), while frigid state 210 represents a minimum page heat (cold). An intermediate heat levels are represented by warm state 220, warm test state 222, and frigid test state 212.

In one technique for implementing the FSM 200, the present state is represented as a set of state bits. A state transition is implemented as a change in value for the state bits. Any technically feasible encoding scheme may be used to map a present state for the instance of FSM 200 into a binary vector comprising the state bits. One state encoding scheme maps the five states of FSM 200 into three state bits, which can actually represent up to $2^3$ or eight different states. In another technique for implementing the FSM 200, the present state is represented using list membership of a corresponding page descriptor. The page descriptor is a data structure configured to be a list element and includes a reference to an associated page of memory being classified by the instance of FSM 200. Unique identity of the instance of FSM 200 is tied to the page descriptor. Each state of the FSM 200 has a corresponding list. When a page descriptor is a member of a particular list, the present state of the corresponding instance of FSM 200 is explicitly given by the state associated with the list. A state transition is implemented as a change in list membership for the page descriptor. This technique is illustrated in greater detail in FIGS. 3A-3B.

Two different techniques have been described herein for storing and updating heat classification states. However, it should be recognized that any technically feasible technique may be used to store and update heat classification states. More generally, any technically feasible technique may be used for storing heat classification states and updating them based on A/D bits without departing the scope of the invention. For example, a plurality of individual FSMs 200 that are concurrently active, each having an independent present state in connection with page heat classification for an associated page, may be used. Also, an arbitrary number of bit values may be used to represent a corresponding number of FSM present states. Similarly, a specific set of arbitrarily large lists may be used to represent a corresponding set of FSM present states.

While the FSM 200 is described solely in terms of states and state transitions, a scan rate parameter ties the operation of the FSM 200 to a functioning system. The scan rate determines how rapidly the A/D bits are sampled, thereby providing a time scale (which is physical in some embodiments or virtual in other embodiments) for classification. For example, a very high scan rate will likely classify few pages as being hot, while a very slow scan rate will likely classify a large number of pages as being hot. Scan rate (inverse of an equivalent scan period) is a key tuning parameter for the technique disclosed herein. It should be noted that the scan rate can be customized for particular use cases and can be dynamically adjustable.

As described previously, one implementation of FSM 200 maps each state (frigid through sizzle) to a unique pattern of three bits or more bits. As an alternative to encoding each state of FSM 200 as a unique bit pattern of state bits, an unencoded history of A/D bit values may be stored. As each new A/D bit is sampled, the new A/D bit is stored in the least significant bit and other bits are shifted by one (with the most significant bit being dropped). When heat classification is needed, these A/D bit values are processed and a heat value is obtained thereby. It should be understood that such a technique represents an equivalent finite state machine implementing plural state encodings rather than unique state encodings, as described previously.

In an alternative embodiment, FSM 200 is altered such that the "1" branch from frigid test state 212 goes to the warm test state 222 instead of the sizzle state 230. In this embodiment, three "1" A/D bit samples in a row are always necessary to reach the sizzle state 230. This embodiment is therefore more conservative in elevating page heat. It should be recognized that other state machines implementing more conservative or less conservative heat elevation and comprising more or fewer page heat states may be implemented without departing the scope or spirit of the present invention.

Figure 3A:
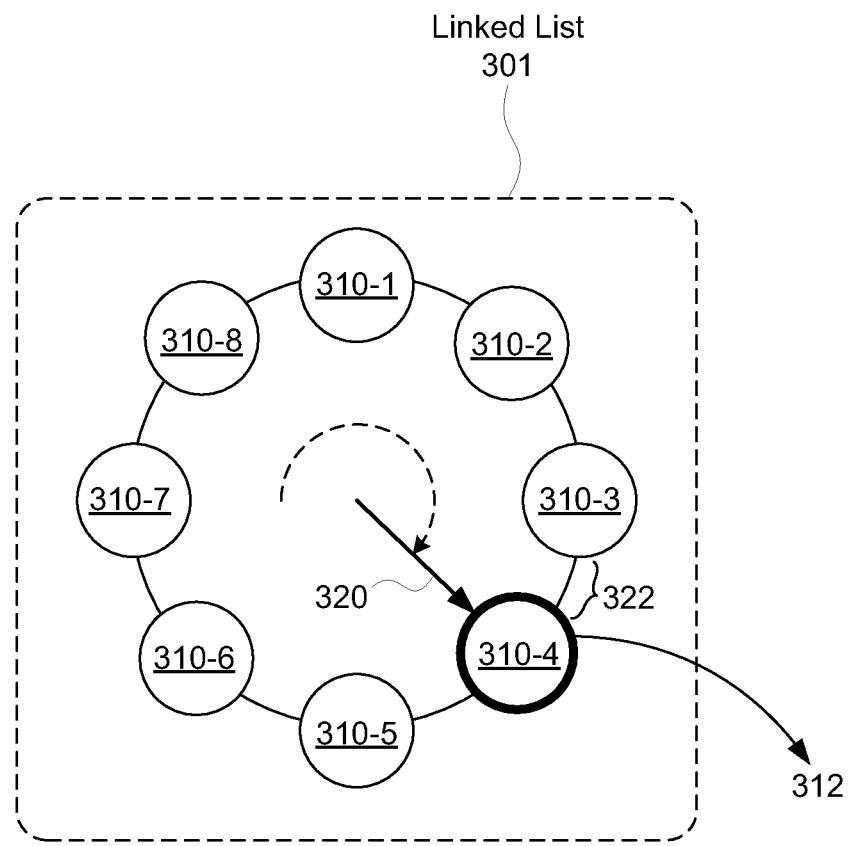
FIG. 3A illustrates a linked list of entries with identical finite state machine states, according to one embodiment of the invention.

FIG. 3A illustrates a linked list 301 of entries 310 (each corresponding to a memory page) with identical finite state machine present states, according to one embodiment of the invention. Membership of a particular entry 310 in the linked list 301 indicates that the instance of FSM 200 associated with the entry 310 is presently in a state associated with the linked list 301. A position pointer 320 is used to select an entry 310 to be evaluated. The outcome of evaluating an entry, such as entry 310-4, is to either move the entry 310-4 to another list (a state transition 312), or to leave the entry in place (a "transition" back to the present state). As described previously, A/D bits for the page associated with the instance of FSM 200 are used to evaluate a new state transition.

In one embodiment, when a new entry is added to linked list 301, it is inserted in position 322, behind the position pointer 320. The position pointer 320 is incremented through list members 310 at a particular scan rate that is sufficiently fast to provide timely state information, but not so rapidly as to incur significant overhead. For example, if new state information is required every second, then the scan rate is adjusted to complete a scan of entries 310-1 through 310-8 once per second. The scan may be structured as a period of rapid evaluation followed by a waiting period, or the scan may be structured to evenly distribute time between evaluating each entry 310. Each linked list associated with a particular state may implement a different scan rate, according to the particular characteristics of an associated state. For example, the scan rate for a linked list associated with frigid state 210 may be much slower than a linked list associated with the sizzle state 230. By tuning the scan rate of each linked list, computational load associated with scanning all related linked lists may be reduced overall without sacrificing timely heat classification for each page. In one embodiment, the scan rate of each linked list may be dynamically modified depending on the rate at which pages are entering or leaving the list. For example, if a large number of pages are leaving a linked list, the scan rate can be increased to be 50% faster.

Figure 3B:
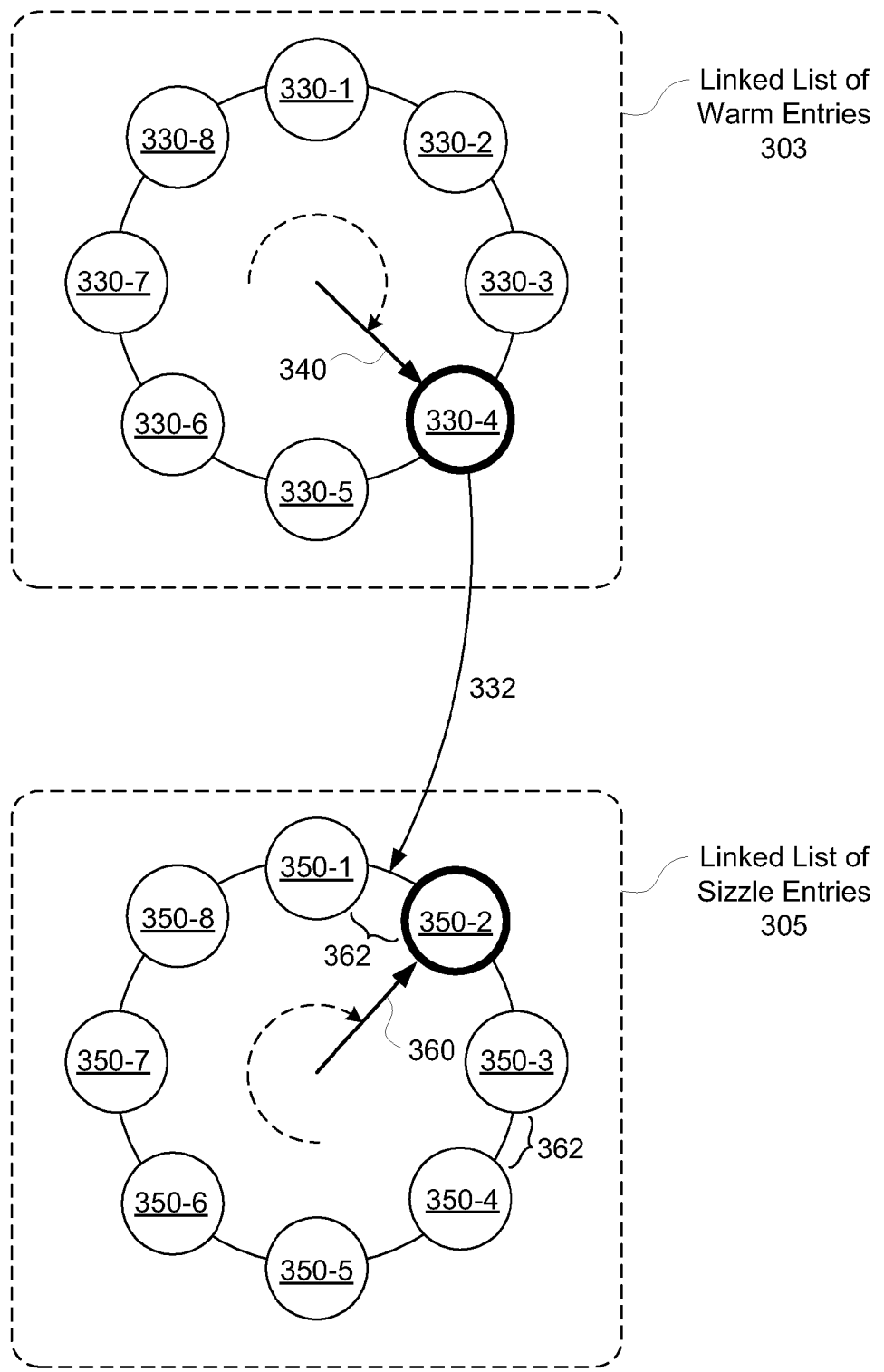
FIG. 3B illustrates a transition from a warm state to a sizzle state for one finite state machine, according to one embodiment of the invention.

FIG. 3B illustrates a transition from a warm state to a sizzle state for one finite state machine, according to one embodiment of the invention. A linked list of warm entries 303 (each corresponding to a memory page) includes entries 330-1 through 330-8. Position pointer 340 indicates that entry 330-4 is to be evaluated. In this example, the page status value is "1" and a corresponding instance of FSM 200 transitions from warm state 220 to sizzle state 230. The state transition is implemented by moving entry 330-4 of the linked list of warm entries 303 to a linked list of sizzle entries 305 (each corresponding to a memory page) at position 362, which is immediately behind position pointer 360 in evaluation order. After entry 330-4 is added to the linked list of sizzle entries 305 at position 362, entries 350-2 through 350-1 are evaluated before entry 330-4 is first evaluated as part of the linked list of sizzle entries 305. In alternative embodiments, entry 330-4 is added to the linked list of sizzle entries 305 at any position.

In the embodiment described above in conjunction with FIGS. 3A and 3B, page table entries of all guest physical memory pages associated with a particular VM 122 are scanned continuously by repeatedly scanning the entries in the frigid, frigid test, warm, warm test, and sizzle linked lists.

In an alternative embodiment, only a single linked list is provided. In such an embodiment, each entry of the linked list corresponds to a memory page, and each entry stores at least a present state of the memory page and a pointer to the next entry in the linked list. Page table entries of all guest physical memory pages associated with a particular VM 122 are scanned continuously by repeatedly scanning the entries in this linked list. In certain variations of this embodiment, entries in the single linked list are stored in a defined order, such as the order of appearance in related page tables or according to their related physical page numbers.

In other embodiments of the present invention, data structures other than linked list data structures may be used for maintaining and iterating over sets of elements, i.e., memory pages, to perform heat classification as described herein. These other data structures include arrays, skip lists, hash tables, doubly-linked list, and other well-known data structures.

Figure 4:
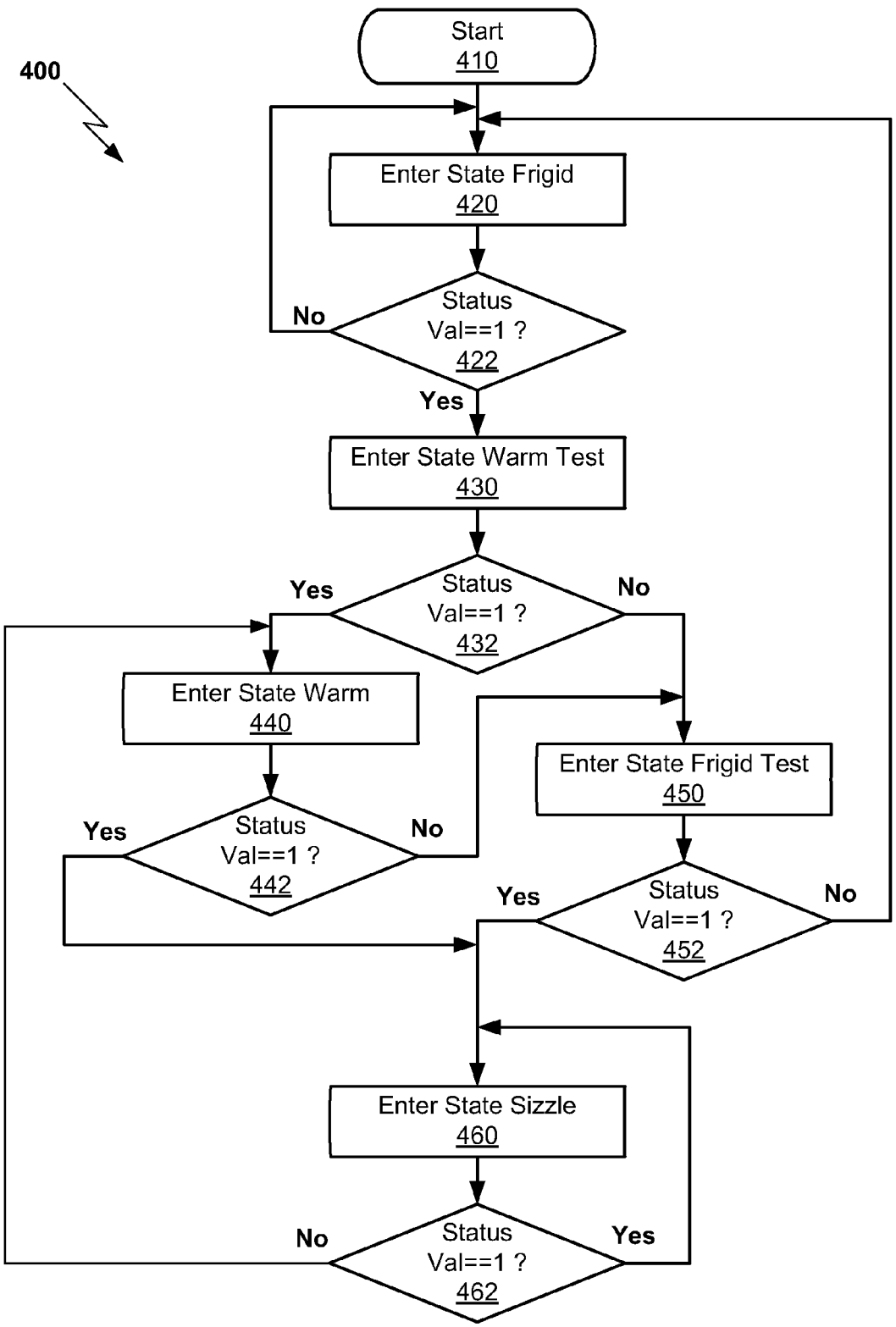
FIG. 4 is a flow diagram of method steps, performed by a hypervisor, for classifying memory pages, according to one embodiment of the invention.

FIG. 4 is a flow diagram of method steps 400, performed by memory page classification module 138 of hypervisor 118, for classifying memory pages, according to one embodiment of the invention. Although the method steps are described in conjunction with the system of FIG. 1, these method steps carried out in any system are within the scope of the invention. In one embodiment, the method steps 400 implement FSM 200 of FIG. 2. Branching decisions within the method are based on the page status value sampled at a predetermined scan rate, as described previously in FIG. 2.

The method begins in step 410, which initializes the FSM to proceed to step 420. In step 420, the FSM enters frigid state. If, in step 422, the page status value is not equal to "1," then the method proceeds back to step 420. However, if the page status value is equal to "1," then the method proceeds to step 430, where the FSM enters warm test state.

If, in step 432, the page status value is equal to "1," then the method proceeds to step 440, where the FSM enters warm state. If, in step 442, the page status value is equal to "1," then the method proceeds to step 460, where the FSM enters the sizzle state.

If, in step 462, the page status value is equal to "1," then the method proceeds to back to step 460. However, if the page status value is equal to "0," then the method proceeds back to step 440.

Returning to step 432, if the page status value is not equal to "1," then the method proceeds to step 450, where the FSM enters frigid test state. In step 452, if the page status value is equal to "1," then the method proceeds to step 460. However, if the page status value is not equal to "1," then the method proceeds back to step 420. Returning to step 442, if the page status value is not equal to "1," then the method proceeds to step 450. The method can continue indefinitely while the hypervisor is executing.

Figure 5A:
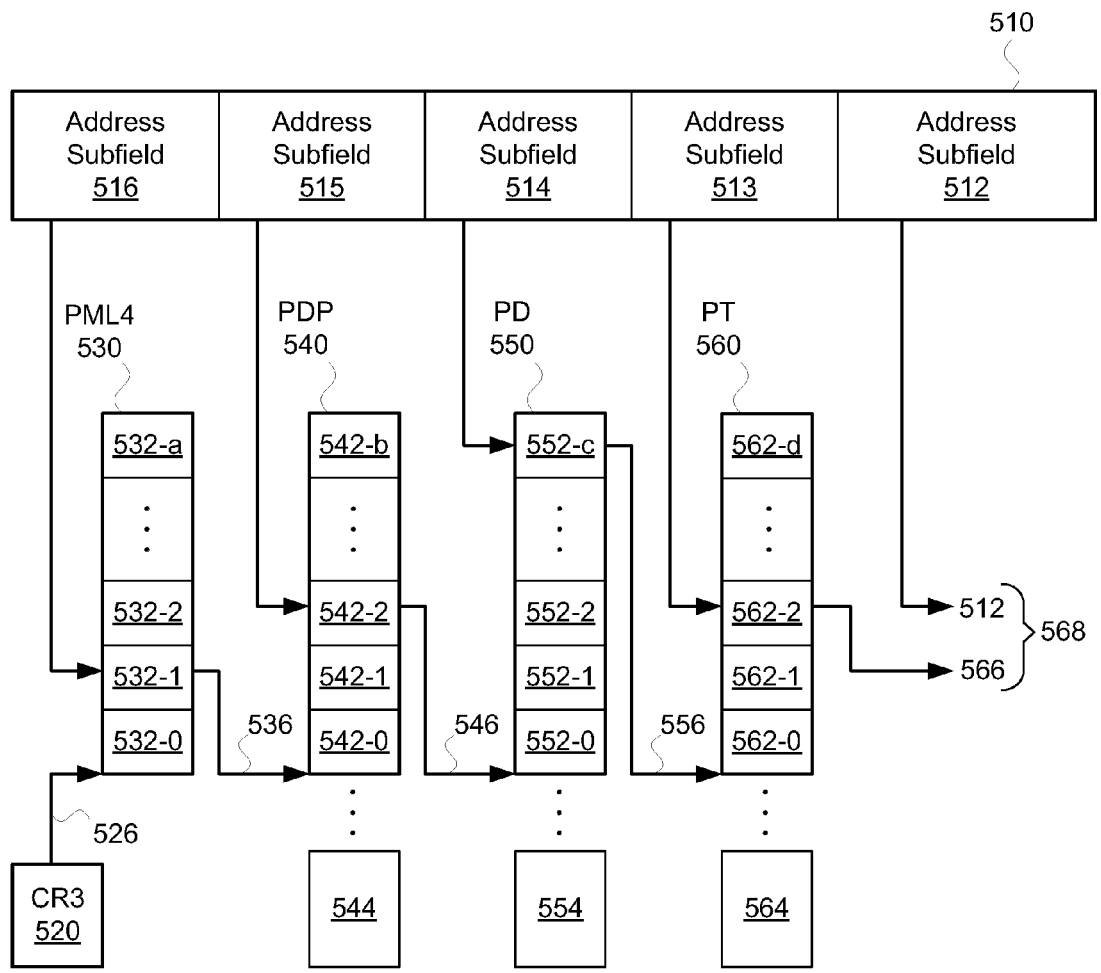
FIG. 5A is a more detailed illustration of page tables in FIG. 1, used for translating a linear virtual address to a machine memory address.

FIG. 5A is a more detailed illustration of hypervisor-managed page tables used for translating a linear virtual address 510 to a machine memory address 568. The page table structures depicted herein are common to prevailing x86 processor architectures, including those from AMD and Intel. In addition, page table structures used for shadow pages and NPT/EPT are similar to the one described here. The virtual address (or guest physical address) 510 is subdivided into a plurality of subfields. In the industry standard x86 processor architecture, for example, one mode of translating a 48-bit linear virtual address 510 to a machine memory address 568 subdivides the virtual address 510 in to five address subfields 512 through 516. Address subfield 516 comprises the nine most significant address bits from virtual address 510. Address subfield 516 is used to index into page map level 4 (PML4) 530 to select a page map level 4 entry (PML4E) 532. Each PML4E 532 includes, without limitation, a machine memory pointer to another type of table referred to as a page directory pointer (PDP) table 540. A total of five-hundred-twelve PML4Es 532 may reside in a given PML4 530. A given PML4 530 is located in machine memory 108 via a processor register CR3 520 residing within a CPU 112. The CR3 520 stores a machine memory pointer 526 to the PML4 530. As shown, address subfield 516 indexes into PML4 530 to select PML4E 532-1, which includes machine memory pointer 536 to PDP 540. A plurality of PDPs 540, 544 may be used in mapping an overall virtual address space to an address space for machine memory 108.

Address subfield 515 comprises the next most significant nine address bits of virtual address 510. Address subfield 515 is used to index into PDP 540 to select a PDP entry (PDPE) 542. Each PDPE 542 includes, without limitation, a machine memory pointer 546 to a page directory (PD) 550. A plurality of PDs 550, 554 may be used in mapping an overall virtual address space to an address space for machine memory 108. Address subfield 514 comprises the next most significant nine address bits of virtual address 510. Address subfield 514 is used to index into PD 550 to select a PD entry (PDE) 552. Each PDE 552 includes, without limitation, a machine memory pointer 556 to a page table (PT) 560. A plurality PTs 560, 564 may be used to mapping an overall virtual address space to an address space for machine memory 108. Address subfield 513 comprises the next most significant nine address bits of virtual address 510. Address subfield 513 is used to index into PT 560 to select a page table entry (PTE) 562. Each PTE 562 includes, without limitation, a page-aligned machine memory pointer to a page within machine memory 108 corresponding to the virtual page of virtual address 510. For example, address subfield 513 is shown indexing into PT 560 to select PTE 562-2, which includes machine memory pointer 566. Address subfield 512 comprises the least significant twelve bits of the virtual address 510. Virtual pages and machine memory pages are aligned with respect to the least significant twelve bits, and therefore address subfield 512 represents the least significant twelve bits of a machine memory address for the virtual address 510.

The above virtual to physical memory translation mechanism enables mapping regions from large, sparsely populated, virtual address spaces to machine memory addresses. It should be recognized that additional translation levels or fewer translation levels may be used, for example, to map larger (64-bit) virtual addresses to machine memory addresses or to map virtual addresses to large machine memory pages comprising more than 4096 bytes per page. For example, a mapping technique that eliminates the PT 560 mapping level may utilize the machine memory pointer 556 from PD 550 to map virtual addresses to machine memory pages comprising two contiguous megabytes each.

Figure 5B:
FIG. 5B illustrates different bit fields within a page table entry, configured to implement one or more aspects of the present invention.

FIG. 5B illustrates different bit fields within a page table entry 562, configured to implement one or more aspects of the present invention. The bit fields include a present bit P 570, a read/write permission bit RW 571, a user/supervisor state bit US 572, an accessed bit A 575, a dirty bit D 576, a physical address PA 578, and at least one unused bit field UBF 580, 582. Additional data may also be represented in each PTE 562. The present bit P 570 indicates that a corresponding page is present in machine memory. The present bit P 570 must be equal to "1" for a valid mapping. The read/write permission bit RW 571 indicates whether the corresponding page may be written or only read. The user/supervisor bit US 572 indicates whether the page may be accessed by a user level process or if only a supervisor level process may access the page. The accessed bit A 575 indicates whether the page was accessed since the accessed bit A 575 was previously cleared. The dirty bit D 576 indicates whether the page was written since the dirty bit D 576 was previously cleared. In conventional x86 systems, the accessed bit A 575 and dirty bit D 576 may be set by hardware in response to a corresponding action, however only software may clear each bit. The physical address PA 578 is a pointer to a 4K-aligned page. The twelve remaining least significant virtual address bits select a byte within the 4K-aligned page. In non-nested mapping applications PA 578 is a pointer to a 4K-aligned page in machine memory 108. In nested applications, PA 578 represents a mapping towards machine memory 108 and therefore may either map a guest virtual address to a guest physical address or a guest physical address to a machine memory address, depending on which stage of nesting is being performed. In nested applications, the first mapping stage is typically managed by a guest operating system, while the second mapping stage is typically managed by a hypervisor hosting the guest operating system.

In conventional x86 architectures, bit fields UBFs 580, 582 represent PTE storage that is unused by CPU hardware and conventionally ignored by system software. PTE bits [11:9], comprising UBF 580, are unused. Additionally, PTE bits [62:52], comprising UBF 582, are also unused. One embodiment of the present invention utilizes three bits of unused bit field storage to store a present state value for FSM 200 of FIG. 2. Any arbitrary state assignment may be used to assign a particular FSM state to a three bit binary value for storage. For example, frigid state 210 may be represented as $\{0,0,0\}$, frigid test state may be represented as $\{0,0,1\}$, warm state may be represented as $\{0,1,0\}$, warm test state may be represented as $\{0,1,1\}$, and the sizzle state may be represented as $\{1,0,0\}$. In alternative embodiments, the FSM state may also be stored in four or more unassigned PTE bits. For example, a one-hot state assignment for FSM 200 would require five unassigned PTE bits (one for each FSM state). It should be recognized that a particular processor architecture may give rise to a certain optimal state mapping with respect to execution performance. Such an optimization is contemplated herein and may be implemented without departing the scope of the present invention.

The hypervisor-managed page tables comprising structures PML4 530 through PT 560 are compact and easily traversed during a heat classification scan. A/D bits for a given page are present in a corresponding PTE, and the FSM 200 present state is also represented in the PTE, providing locality of reference when evaluating a heat classification for the page. In alternative embodiments, state values for instances of FSM 200 may be stored in an arbitrary data structure, potentially independent of PTEs or related page tables structures.

Figure 6:
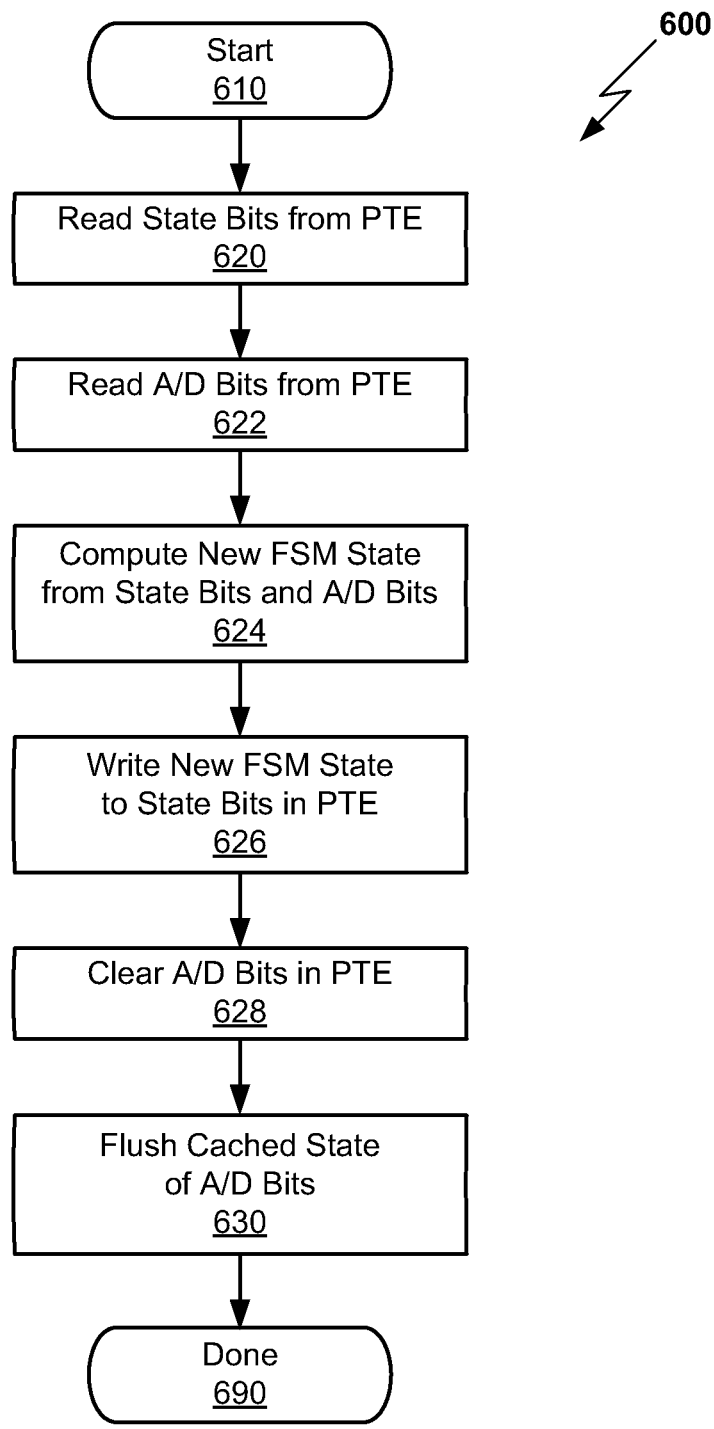
FIG. 6 is a flow diagram of method steps, performed by a hypervisor, for classifying memory pages based on state stored in a page table entry, according to one embodiment of the invention.

FIG. 6 is a flow diagram of method steps 600, performed by memory page classification module 138 of hypervisor 118, for classifying memory pages based on state stored in a page table entry, according to one embodiment of the invention. Although the method steps are described in conjunction with the system of FIG. 1, these method steps carried out in any system are within the scope of the invention.

Memory page classification module 138 walks a set of related PTE entries within hypervisor-managed page tables to identify PTEs with associated pages requiring updated heat classification. Heat classification for the set of identified pages is updated with a frequency specified by the scan rate parameter discussed in FIG. 2. Memory page classification module 138 performs method steps 600 to update heat classification for each identified memory page. Heat classification for the identified memory page is updated by evaluating a next state for an FSM based on present state FSM bits and A/D bits stored within the related PTE. In one embodiment, the FSM state bits represent a present state of an instance of FSM 200. Any technically feasible technique may be used to walk the set of related PTE entries.

The method begins in step 610, where memory page classification module 138 has identified a particular page for classification. In step 620, memory page classification module 138 reads state bits from the related PTE. In step 622, memory page classification module 138 reads A/D bits from the related PTE. In step 624, memory page classification module 138 computes a new FSM state based on the A/D bits and the state bits read in steps 620, 622. In one embodiment, the new FSM state is computed according to FSM 200. Either an A bit or a D bit is used in conjunction with the state bits to compute the new FSM state. The A bit is used for applications classifying page heat based on both read and write accesses, while the D bit is used for applications classifying page heat based exclusively on write access. Therefore, either the A bit or the D bit is used to determine a next state transition to the new FSM state from a present state, as illustrated in FIG. 2. In step 626, memory page classification module 138 writes the new FSM state to the state bits within the PTE. In step 628, memory page classification module 138 clears the A/D bits within the PTE. In step 630, any cached state of these bits, e.g., in a translation look-aside buffer (TLB) configured to cache a mapping corresponding to the PTE, is also flushed. The method terminates in step 690.

Steps 620 and 622 may be combined into a single read from machine memory 108 for implementations where the state bits and A/D bits are represented in the same memory word. Similarly, steps 626 and 628 may be combined into a single write to machine memory 108 for similar implementations.

It should be recognized that FSMs other than FSM 200 may be implemented to classify page heat without departing the scope and spirit of the present invention. For example, FSMs that include more than five states and respond to more samples may be used for finer grain classification. The present invention contemplates an arbitrary number of states in a classification FSM, and an arbitrary heat classification granularity.

The techniques taught herein for classifying page heat have general applicability, including, but not limited to, the usage cases discussed below. One application enables efficient process migration, such as live VM migration, from one host machine to another host machine. A given source VM includes state stored in processor registers and state stored in pages of memory. State for the source VM is transmitted to a destination VM while the source VM continues to execute. At some point, the source VM is halted and any remaining state is transmitted to the destination VM. Each memory page that is transmitted needs to be re-transmitted if the source VM writes the page prior to being halted. One goal of live VM migration is to minimize the duration of down time associated with halting a source VM and beginning execution of a destination VM. A second goal is to minimize the total time required to perform the migration. Page heat classification enables a live VM migration operation to preferentially identify the coldest (least likely to be written) pages for transmission. In this way, only a relatively minimal hot working set of pages being actively written by the source VM needs to be transmitted during the down time. In this way, downtime can be minimized. Furthermore, by sending cold pages first, the number of pages needing to be retransmitted is reduced, thereby reducing overall migration time.

Another example involves creating an efficient checkpoint for a fast resume operation. A checkpoint is created for an executing virtual machine (or any arbitrary application) by sending the machine state, including active memory pages, for the virtual machine to a log file or another host for storage. A resume operation loads state information from the checkpoint log file into memory and resumes execution of the associated virtual machine after some portion of the checkpoint has been loaded into memory. Page heat at the time a given checkpoint is initiated, is recorded as part of the checkpoint. A subsequent resume operation from the checkpoint loads pages based on a page heat priority, with the hottest pages loaded first and coldest pages loaded last. During the resume operation, a read or write access to any arbitrary page that has not yet been loaded can cause the corresponding page to be loaded with a priority above the page heat priority. In this way, pages that have been actually requested are available with highest priority, while pages that are likely to be accessed in the near future (hot pages) are loaded next, and pages that are least likely to be accessed in the near future are loaded last. Any technically feasible technique may be used to store page heat for a checkpoint. For example, page heat for a given checkpoint may be recorded in a separate file that is accessed during a resume operation to schedule a load sequence for the pages based on page heat. Alternatively, page heat may be implied within the checkpoint by recording pages in the log file that are sorted according to page heat. During a resume operation, the checkpoint file may be loaded sequentially, which has the effect of loading pages according to page heat. One technique for generating a checkpoint for a fast resume operation uses the accessed A bit for the page status value.

Page heat classification may also be applied to more efficiently generate a checkpoint. When the checkpoint is generated, pages are sent for storage in priority order from coldest to warmest. By speculatively saving cold pages in anticipation of a checkpoint operation, the time required to complete a checkpoint operation is reduced. Saving cold pages is an opportunity to save a potentially significant portion of checkpoint state with a low likelihood of needing to re-save the state once the checkpoint operation is actually initiated.

Page heat classification may also be applied in creating fast checkpoints. Creating a checkpoint typically involves sending an initial machine state image to a log file or another host (hot spare), followed by incremental differences that comprise the checkpoints. The incremental differences primarily include pages that have been written (i.e., dirty bit is set) since the last checkpoint. Creating fast checkpoints (multiple checkpoints per second) is a challenging problem because each checkpoint needs to be completed according to a hard real-time deadline. Adding to the challenge is the fact that a given page may be written after it has already been sent as part of the checkpoint. By availing page heat classification information to a fast checkpoint function, the pages comprising the checkpoint may be sent in an order based on heat classification rather than whether they were simply written. One implementation of page heat classification for fast checkpoint generation uses the page D bit for the page status value.

NUMA (Non-Uniform Memory Access) page migration may be optimized using page heat classification. Each machine memory page in a conventional NUMA cluster can be mapped to any virtual page on any NUMA node within the NUMA cluster. However, read and write memory access performance is significantly better for virtual pages mapped to machine memory pages that are local to the NUMA node rather than machine memory pages associated with a different (non-local) NUMA node. With heat classification available for each page within the NUMA cluster, a given hot page may be migrated (copied and re-mapped) to whichever NUMA node is accessing the hot page most frequently. One implementation of page heat classification for NUMA page migration uses the page A bit for the page status value.

Page heat classification may also be applied to improving overall power efficiency for machine memory. Pages of machine memory can be segregated according to their heat classification, which includes both read and write accesses. For example, pages classified as being cold may be copied and remapped to a physically separate portion of machine memory, such as a physically separate memory module. The separate memory module can then be operated in a low power mode. Pages classified as warm through sizzle (hot) are similarly moved to a common portion of machine memory, which is operated in an appropriately high performance (power) mode. Many modern memory subsystems include operating modes that trade off power and performance, allowing the memory subsystems to operate in a reduced power mode when prevailing access performance requirements are reduced. One implementation of page heat classification for improving power efficiency uses the page A bit for the page status value.

Page heat classification may also be incorporated into a paging system within either a hypervisor or a general operating system. When a machine memory page needs to be allocated, but none are currently free, a page eviction policy within the paging system selects which machine memory page should be flushed to a mass storage system to make space for the newly allocated page. Prior art systems conventionally use an event-driven eviction policy, such as a "Least Recently Used" (LRU) or "Least Recently Allocated" (LRA) policy. Such event-driven policies do not necessarily predict which pages are likely to be needed in the future. Indeed, while such policies work reasonably well, they simply indicate which pages have been resident longest in the past. A paging system that incorporates page heat classification into an associated page eviction policy preferentially pages out machine memory pages classified as frigid (cold) because they are least likely to be needed in the near future. Hot pages are avoided when paging because they are most likely to be needed in the near future. One implementation of page heat classification for an improved eviction policy uses the page A bit for the page status value.

Page heat classification may also be used to predict downtime for a process migration operation. Such a prediction may be useful, for example, in determining whether to migrate a given processes from one computer system to another at a particular time. A page heat profile for the target process, in conjunction with estimates for transmitting related data, can be used to closely predict how long a proposed migration operation will take for the target process. Predicted process migration time for a proposed migration operation can be used to determine whether or when to migrate a given process. Furthermore, a set of predicted migration times for processes within a cluster can be used to facilitate efficient load balancing for the cluster. One implementation of page heat classification for process migration time prediction uses the page D bit for the page status value.

In sum, a technique for online page classification is disclosed herein. Classification is tuned for a particular task with a scan rate parameter. The technique periodically samples and clears A/D bits, based on the scan rate parameter, to classify individual pages as being frigid (cold) through sizzling (hot). Classification may be performed by a finite state machine that responds to a history of the A/D bits or by examining a recent history of A/D bit values on an as-needed basis. In certain usage modes, the technique uses only D bits to determine page heat, while in other usage modes the technique uses A bits to determine page heat. A present state for each finite state machine is stored using otherwise unused bits within a standard page table entry (PTE).

One advantage of the present invention is that online classification of each memory page enables memory management functions to better schedule operations based on page heat. For example, live VM migration may perform pre-copy rounds that preferentially target cold through warm pages of memory prior to halting a source VM and copying any remaining context to a destination VM. In this way, the remaining context is generally minimized, which reduces any disruption in the operation of the source VM and reduces overall migration time. One advantage of storing heat classification state within a PTE is that this representation conserves memory and presents excellent locality of reference characteristics during a classification operation.

Although embodiments of the present invention have been described as being applied in a virtual machine environment with hypervisor-managed page tables, the techniques described herein are also applicable to operating systems that employ page tables to manage virtual memory to physical memory page mappings. Furthermore, the techniques taught herein may also be implemented in hardware, such as microcode in a microcode-driven processor, or directly implemented in logic circuits within a processor or processor support device.

It should be recognized that various modifications and changes may be made to the specific embodiments described herein without departing from the broader spirit and scope of the invention as set forth in the appended claims.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

We claim:

1. A method of classifying an activity level of memory pages that are accessed by one or more virtual machines executing in a host machine, comprising:
   scanning page table entries of hypervisor-managed page tables over multiple scan periods, wherein the page table entries are used to translate a virtual memory address to a machine memory address; and
   for each of the memory pages and at each scan period, performing:
      accessing a page table entry corresponding to the memory page with a single read to determine a current activity level of the memory page and whether the memory page has been accessed since a prior scan;
      determining a new activity level of the memory page using a finite state machine based on the current activity level and whether the memory page has been accessed since the prior scan, wherein the finite state machine has at least first and second states, each corresponding to a different activity level of the memory page, the finite state machine transitioning from the first state to a state different from the first state when the memory page has been accessed since the prior scan and from a state different from the second state to the second state when the memory page has not been accessed since the prior scan; and
      storing the new activity level of the memory page in a section of the page table entry corresponding to the memory page as the current activity level, wherein the page table entry also includes information indicating whether the memory page has been accessed since the prior scan.

2. The method according to claim 1, wherein at least one bit of the page table entry corresponding to the memory page is used to encode the new activity level, and the new activity level of the memory page is encoded as either high or low.

3. The method according to claim 2, wherein two or more of the bits of the page table entry corresponding to the memory page are used to encode the new activity level, and the new activity level of the memory page is encoded as one of high, low, and at least one intermediate level between high and low.

4. The method according to claim 1, wherein the page table entries are scanned in order from physical page number 0 to physical page number N−1, where N is the number of memory pages scanned during one scan period.

5. The method according to claim 1, wherein the new activity level of a memory page is determined by examining whether the accessed section of the page table entry corresponding to the memory page is set.

6. The method according to claim 5, further comprising:
   clearing the bit in the accessed section of the page table entry corresponding to the memory page after determining the new activity level of the memory page.

7. The method according to claim 6, further comprising:
   clearing any cached state of the bit in the accessed section of the page table entry corresponding to the memory page after determining the new activity level of the memory page.

8. The method according to claim 1, wherein the new activity level of a memory page is determined by examining whether a dirty bit of the page table entry corresponding to the memory page is set.

9. The method according to claim 8, further comprising:
   clearing the dirty bit of the page table entry corresponding to the memory page after determining the new activity level of the memory page.

10. The method according to claim 9, further comprising:
    clearing any cached state of the dirty bit in the accessed section of the page table entry corresponding to the memory page after determining the new activity level of the memory page.

11. The method of claim 1, wherein a virtual machine in the one or more virtual machines comprises a guest operating system (OS), the method further comprising:
    determining guest virtual memory pages that are mapped to guest physical memory pages using a backmap maintained by the hypervisor;
    determining the new activity level for guest virtual memory pages using the hypervisor-managed page tables; and
    using the new activity level determined for the guest virtual memory pages as the new activity level for the guest physical memory pages that are mapped to the guest virtual memory pages.

12. A non-transitory computer-readable storage medium comprising instructions, which when executed in a computer system including a hypervisor for managing page tables and a virtual machine including a guest operating system, causes the computer system to carry out the steps of:
    storing a plurality of hierarchically arranged page tables, wherein the page tables are used to translate a guest memory address to a machine memory address, and each entry of a page table at a level stores a mapping to a memory page and includes at least one bit, other than an accessed bit and a dirty bit, that indicates a current activity level of the memory page; and accessing an entry of the page table at the level with a single read to read the at least one bit and the accessed bit or the dirty bit when performing an operation associated with the memory page;

determining a new activity level of the memory page using a finite state machine based on the at least one bit and the accessed bit or the dirty bit, wherein the finite state machine has at least first and second states, each corresponding to a different activity level of the memory page, the finite state machine transitioning from the first state to a state different from the first state according to the accessed bit or the dirty bit and from a state different from the second state to the second state according to the accessed bit or the dirty bit; and setting the at least one bit according to the new activity level of the memory page.

13. The non-transitory computer-readable storage medium of claim 12, wherein the at least one bit is encoded as either high or low.

14. The non-transitory computer-readable storage medium of claim 12, wherein the at least one bit that are set according to the new activity level of the memory page includes two or more of the bits of the page table entry of the page table at the level, and the two or more of the bits are encoded as one of high, low, and at least one intermediate level between high and low.

15. The non-transitory computer-readable storage medium of claim 12, wherein the at least one bit that are set according to the new activity level of the memory page includes three bits of the page table entry of the page table at the level, and the three bits are encoded as one of low, first intermediate, second intermediate, third intermediate, and high.

16. The non-transitory computer-readable storage medium of claim 12, wherein the page tables are part of a software memory management unit.

17. The non-transitory computer-readable storage medium of claim 12, wherein the page tables are part of a hardware memory management unit.

18. The non-transitory computer-readable storage medium of claim 12 wherein:
the guest operating system maintains a guest OS-managed page table translating guest virtual memory to guest physical memory;
the hypervisor-managed page tables translate guest physical memory to machine memory; and
the hypervisor monitors the activity level of a guest physical memory page based on the activity level of the memory page in the page table entry in a hypervisor-managed page table for the memory page.

19. A non-transitory computer-readable storage medium comprising instructions, which when executed in a computer system including a hypervisor for managing page tables, causes the computer system to carry out the steps of:

scanning page table entries of hypervisor-managed page tables over multiple scan periods, wherein the page table entries are used to translate a virtual memory address to a machine memory address; and for each of the memory pages and at each scan period, performing:
accessing a page table entry corresponding to the memory page with a single read to determine a current activity level of the memory page and whether the memory page has been accessed since a prior scan;

determining a new activity level of the memory page using a finite state machine based on the current activity level and whether the memory page has been accessed since the prior scan, wherein the finite state machine has at least first and second states, each corresponding to a different activity level of the memory page, the finite state machine transitioning from the first state to a state different from the first state when the memory page has been accessed since the prior scan and from a state different from the second state to the second state when the memory page has not been accessed since the prior scan; and storing the new activity level of the memory page in a section of the page table entry corresponding to the memory page as the current activity level, wherein the page table entry also includes information indicating whether the memory page has been accessed since the prior scan.

20. The non-transitory computer-readable storage medium of claim 19, wherein the new activity level of the memory page is determined based on whether the memory page has been accessed since a prior scan and the current activity level of the memory page.

21. The non-transitory computer-readable storage medium of claim 19, wherein the page table entries are scanned in order from physical page number 0 to physical page number N−1, where N is the number of memory pages scanned during one scan period.

* * * * *